United States Patent [19]

Bangert

[11] 4,009,859
[45] Mar. 1, 1977

[54] PAN FOR BAKING HAMBURGER ROLLS

[76] Inventor: Albert C. Bangert, 1927 Queenswood Drive, York, Pa. 17403

[22] Filed: Jan. 8, 1976

[21] Appl. No.: 647,631

[52] U.S. Cl. .......................... 249/122; 249/DIG. 1
[51] Int. Cl.² ............................................ B28B 7/26
[58] Field of Search .......... 249/119, 120, 122, 123, 249/129, 135, 175, 52, 57, 63; 220/20, 21, 70; 217/21, 26, 26.5; 229/2.5; 426/128, 138; D1/24, 99; D7/43; D9/183, 187; 99/DIG. 15

[56] References Cited

UNITED STATES PATENTS

| | | | |
|---|---|---|---|
| 1,476,910 | 12/1923 | Naugle | 249/122 |
| 1,718,668 | 6/1929 | Smythe | 249/DIG. 1 |
| 2,097,356 | 10/1937 | Truesdale | 249/122 |
| 2,459,168 | 6/1949 | Jocelyn | 249/120 |
| 3,033,101 | 5/1962 | Meyers | 249/DIG. 1 |

Primary Examiner—Francis S. Husar
Assistant Examiner—W. R. Briggs
Attorney, Agent, or Firm—C. Hercus Just

[57] ABSTRACT

A substantially square hamburger roll having one face indented to form a rim around the perimeter and a bakepan to form the same, said bakepan having square cavities extending inward from one face and a square re-entrant projection extending centrally upward into each cavity a distance less than the depth of the cavities to form a peripheral gutter in each cavity to form the rims around the rolls baked in said bakepan.

3 Claims, 8 Drawing Figures

PAN FOR BAKING HAMBURGER ROLLS

CROSS-REFERENCE TO RELATED APPLICATION

This application is a companion application to Design Patent application filed by the same inventor on even date herewith, Ser. No. D-647,632.

BACKGROUND OF THE INVENTION

For many years, circular rolls have been used popularly for hamburgers by slicing the same transversely through the rolls. It also is popular at present for bakeries to merchandize circular hamburger rolls pre-sliced. When a hamburger is placed between the halves of a sliced hamburger roll, it is quite customary to add additional flavoring such as relish, catsup, mustard, sliced onion, etc., between the hamburger and the sliced roll surfaces. Some of these arrangements are quite thick, with the result that certain amounts of the added material falls from between the sliced roll section, as well as a relatively thick arrangement of this type being somewhat messy to eat.

The aforementioned difficulties can very largely be obviated by using hamburger rolls embodying the present invention, said rolls being made by forming and baking the same in a non-conventional type of bakepan also comprising part of the present invention. Details of said hamburger roll and a pan to form the same, in which the rolls are also baked, are set forth in detail hereinafter.

SUMMARY OF THE INVENTION

It is one of the principal objects of the present invention to provide a preferably substantially square hamburger roll having a substantially square recess extending inward from one surface thereof and thereby providing a rim extending around the perimeter of the roll, said recess being adapted to receive a hamburger as well as additional flavorings and condiments, whereby when two of said rolls are employed, a hamburger and said additional flavor material and condiments may be substantially completely enclosed at the edges of the assembled rolls so as to minimize the possibility of messy conditions occuring as well as prevent the spilling and consequent waste of material incident to the hamburger and rolls being consumed.

Another object of the invention ancillary to the foregoing object is to provide substantially V-shaped notches in each corner of the rims surrounding the recesses in said rolls and thereby minimizing the occurance of bulky corners in said roll which otherwise tend to occur if said notches are not employed, the inclusion of said notches also insuring that the outer or upper surfaces of said rims of said rolls will be disposed substantially entirely within a common plane.

A further object of the invention is to provide a bakepan formed from sheet metal or the like so as to be of a rigid nature, said basic sheet having a series of recesses extended thereinto from one surface, said recesses being substantially square in configuration and the bottom of said recesses having a re-entrant substantially square projection extending upward from the bottom of said recesses a distance less then the depth of said recesses and thereby forming a square gutter within said recesses to provide a form upon which a substantially square piece of dough of uniform thickness may be shaped by extending the edges of the dough into said gutters of the said recesses to form a rim around the perimeter of the rolls and the surface of said rolls next to all surfaces of said substantially square projection being baked but relatively free from crust, while the uppermost surface of the dough disposed in said recesses is provided with a conventional crust when baked, whereby the crust-free interior of said roll is capable of limited absorbtion of flavoring and condiment material added to a hamburger when the same is contained either in a single roll or between a pair of said rolls disposed in face-to-face relationship in which the rims of the rolls either directly or substantially abut each other.

Still another object of the invention is to provide the corners of said projections in said recesses with substantially V-shaped projections which extend radially outward from said corners into the corners of said gutter and said projections extending downward and outward from the upper surfaces of said projections toward the bottom of said gutter for purposes of forming notches in said rolls to minimize the occurance of bulky corners therein.

Details of the foregoing objects and of the invention, as well as other objects thereof, are set forth in the following specification and illustrated in the accompanying drawings comprising a part thereof.

DETAILED DESCRIPTION

Figure 4:
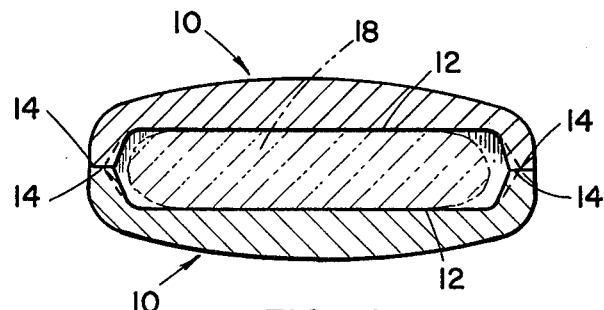
FIG. 4 is a transverse sectional view of a pair of the rolls shown in FIGS. 1 and 2 disposed in mating relationship to enclose and exemplary hamburger within the recesses of said mated rolls.
Figure 5:
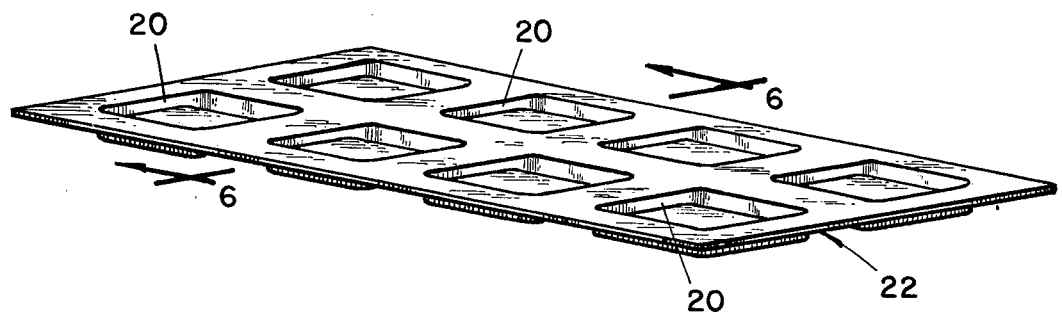
FIG. 5 is a perspective view of an exemplary bakepan within which rolls of the type illustrated in FIGS. 1–4 may be formed and baked.

Referring to FIGS. 1–4, it will be seen that the hamburger roll 10 is substantially square in plan view, whereby in use, for example, said roll more closely resembles a slice of loaf bread which is commonly used for making sandwiches. One surface of the roll 10 is provided with a substantially square recess 12, the transverse dimensions of which are less than that of the roll 10 so as to provide a rim 14 of limited width. Preferably, the recess 12, as can best be visualized from FIGS. 2 and 4, has a depth of substantially half the thickness of the roll, whereby said roll, when observed from the outer surface 16 somewhat resembles a half of a roll and, accordingly, when two of said rolls are placed in mating relationship with the rims 14 substantially abutting as shown in FIG. 4, said pair of rolls will neatly and capably enclose a hamburger 18 as well as condiment and flavoring material which may be desired upon the same.

The rolls 10 are baked within recesses 20 formed in a non-conventional type of bakepan 22, said recesses being substantially square in plan view and each recess having a substantially square projection 24 extending upward from the bottom of each recess 20. The transverse dimensions of the projections 24 are less than the corresponding dimensions of the recesses 20, thereby to provide a gutter 26 which is square in plan view, said gutter being preferably approximately half the depth of the recesses 20 and the width of the gutter preferably being slightly wider than the height of the projections 24 so that when the edges of squares of raw dough are pressed into said gutters, the baked rim 14 of the rolls will be sufficiently strong to consitute enclosing means for a hamburger and flavoring or condiment material used thereon.

Figure 6:
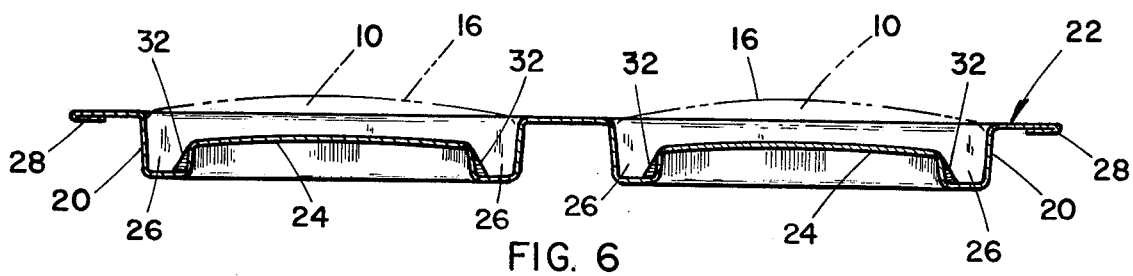
FIG. 6 is an enlarged transverse sectional view of the bakepan of FIG. 5 as seen on the line 6—6 thereof.
Figure 7:
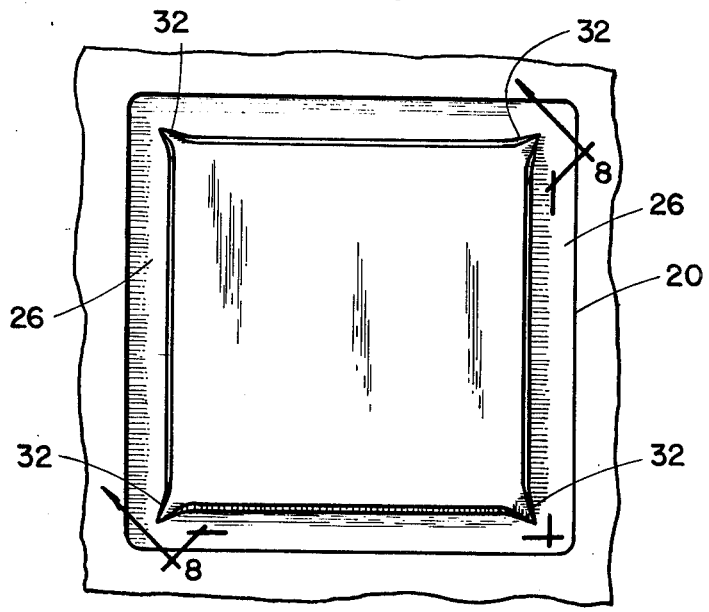
FIG. 7 is a fragmentary, enlarged plan view of a single recess formed in the pan shown in FIGS. 5 and 6 and illustrating details of the projection provided in each recess of said pan.
Figure 8:
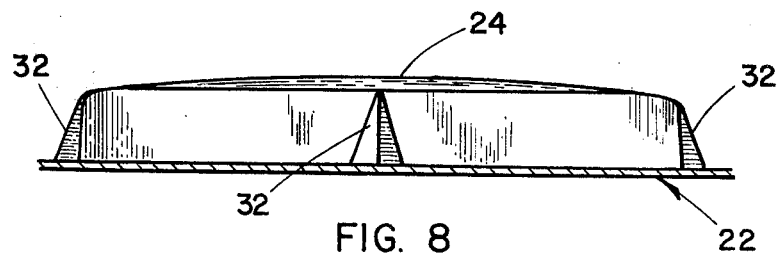
FIG. 8 is a fragmentary diagonal sectional view of the projection in the recess shown in FIG. 7 as seen on the line 8—8 thereof.

The bakepan 22 may be formed from suitable sheet metal such as aluminum, or sheet steel preferably suitably plated with non-corroding material such as tin, chromium or otherwise. A sheet of said material readily may be formed into said bakepan by a pressing operation involving the employment of dies and the outer edges 28 of the bakepan preferably are turned upon themselves to form reinforcements as shown in FIG. 6

The raw dough from which the hamburger rolls 10 are formed, after being cut into squares as referred to above, is placed in each of the recesses 20 and the edges of the dough is appropriately forced, by hand or otherwise, into the gutters 26, whereby the dough overlies the upper surfaces of the projections 24 and the dough then is permitted to proof in this condition for a suitable amount of time in order to permit the dough to rise and thereby condition it for baking. Following proofing of the dough for a suitable predetermined period, the bakepan 22 with the proofed dough in the recesses 20 then is baked. The proofing of the dough causes the upper surfaces thereof to rise a slight distance above the upper surface of the pan 22, somewhat as shown in exemplary manner in FIG. 6, whereby the outer surface 16 of each of the rolls will have a crowned configuration somewhat resembling that of a conventional hamburger roll.

Figure 1:
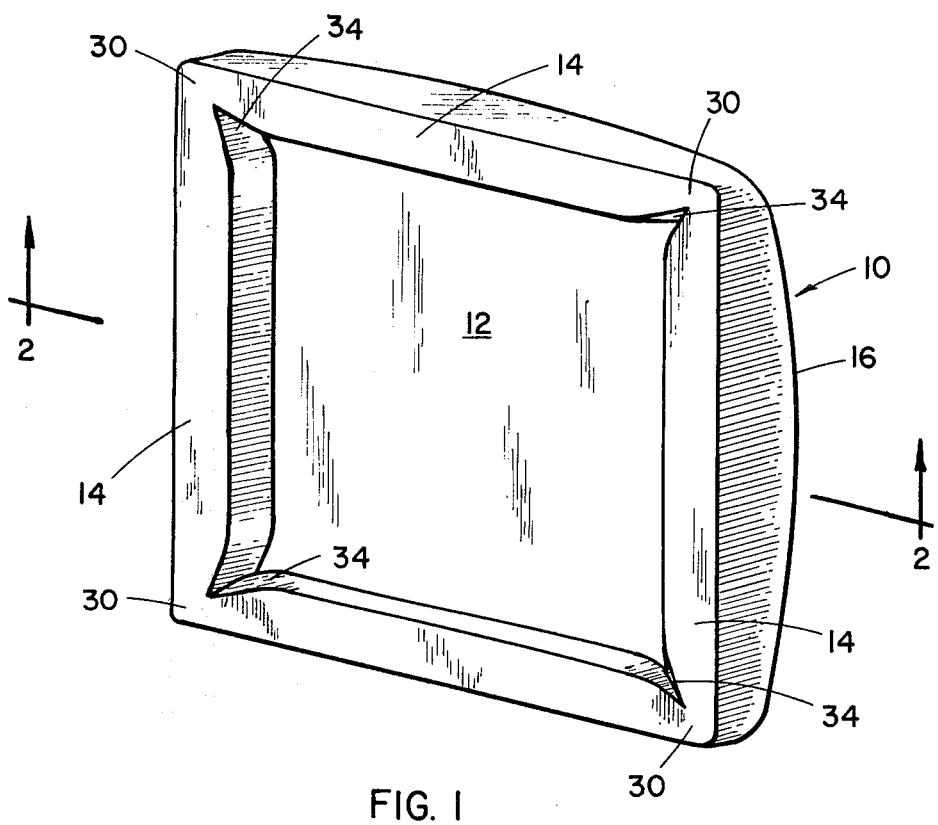
FIG. 1 is a perspective view of an exemplary roll embodying the principles of the present invention, said view showing the recessed surface of said roll.
Figure 2:
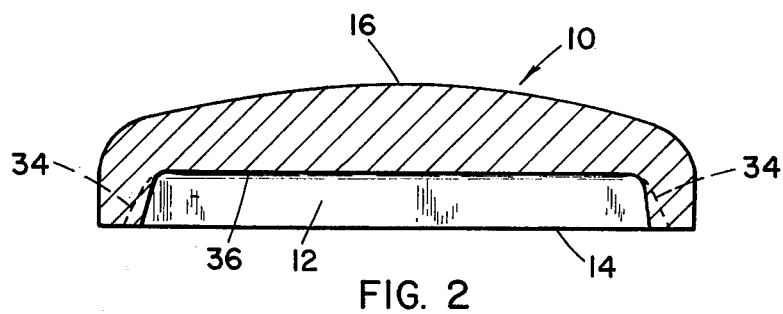
FIG. 2 is a transverse sectional view of the roll shown in FIG. 1 as seen on the line 2—2 thereof.
Figure 3:
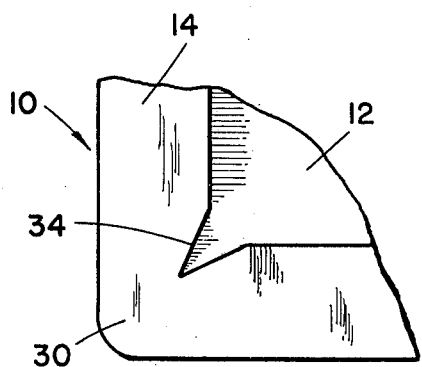
FIG. 3 is a fragmentary, enlarged plan view of one corner of said roll to show greater details of the notches formed in the corners of said rim of the rolls.

It has been found by experimentation that if a square piece of raw dough is placed in the recesses 20 and the edges thereof are forced into the gutters 26, the corners 30 of the rims 14 of the roll tend to undesirably enlarge and thereby distort the corners of the rolls undesirably. In developing the present invention however, it has been found that this can be prevented by including radially extending projections 32 at the corners of the projections 24, said projections preferably slope from the central surfaces of the projections 24 outwardly and downwardly into the gutters 26. These projections result in the formation of substantially V-shaped notches or grooves 34 which extend radially into the corners 30 of the rims 14 of the rolls 10 and thereby produce corners in the outer surface 16 of the rolls 10 which are not abnormally enlarged and said outer surface presents a smoothly curved surface along the edges and at the corners as generally illustrated in FIGS. 1, 2 and 4 of the drawings.

In view of the fact that the outer surface 16 of the rolls is exposed to the heat of the bake oven, it will have a crust thereon when baked, whereas the inner surface 36 of the rolls 10, while being baked, will have no appreciable crust thereon and usually is even slightly porous, whereby the same is capable of absorbing, to at least a limited extent, liquid or moist type flavoring or condiment material placed upon the hamburger 18 when disposed within the recess 12 of a single roll or between such recesses when a pair of said rolls are used to enclose the hamburger as shown in FIG. 4.

From the foregoing, it will be seen that the present invention provides a useful type of hamburger roll capable of minimizing messy conditions incident to containing a hamburger and flavoring or condiment material, especially when a pair of said rolls are used in rim-abutting relationship to substantially completely enclosed the hamburger and condiment material. The invention also includes a non-conventional type of bakepan having recesses therein specifically designed to produce hamburger rolls 10 having the recesses 12 therein described hereinabove and illustrated in he drawings. The rolls comprising the present invention may readily be packaged in somewhat nested relationship and enclosed within suitable packages such as transparent plastic bags, boxes, or otherwise and sold in fresh condition. If desired, said rolls may be stored in frozen condition within such packages.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A bakepan for baking substantially square hamburger rolls having one face provided with a substantially square indentation to provide a rim around the perimeter of said one face of said roll, said pan comprising a metal sheet having a plurality of substantially square recesses of uniform depth extending into said sheet from one surface thereof, the bottom of each recess having a substantially square reentrant projection of less area than said recesses extending upward into said recesses to a height less than the depth of said recesses to form a relatively narrow gutter extending around said projections to form rims of substantially uniform height and width around the perimeters of rolls formed in said recesses, and the corners of said projections being provided with a substantially V-shaped radial projection extending partially toward the corresponding corners of said recesses to form notches in the corners of said rims of rolls baked in said recesses and thereby minimize the thickness of said rims of said rolls at the corners thereof to facilitate the formation of rims on said rolls having outermost surfaces thereon disposed within a common plane for close mating with the rim of a similar roll.

2. The bakepan according to claim 1 in which said radial projections taper toward the bottom of the corners of said gutters.

3. The bakepan according to claim 1 in which said projections have a radial dimension less than half the diagonal dimension of the corners of said gutters.

* * * * *